(12) United States Patent
Andersen

(10) Patent No.: US 12,650,287 B2
(45) Date of Patent: Jun. 9, 2026

(54) DIGITAL TAPE MEASURE AND MOUNTING SYSTEM

(71) Applicant: Ethan Andersen, Bondurant, IA (US)

(72) Inventor: Ethan Andersen, Bondurant, IA (US)

( * ) Notice: Subject to any disclaimer, the term of this patent is extended or adjusted under 35 U.S.C. 154(b) by 0 days.

(21) Appl. No.: 19/319,223

(22) Filed: Sep. 4, 2025

(65) Prior Publication Data

US 2026/0002764 A1     Jan. 1, 2026

Related U.S. Application Data

(63) Continuation of application No. 19/226,903, filed on Jun. 3, 2025.

(60) Provisional application No. 63/655,902, filed on Jun. 4, 2024.

(51) Int. Cl.
| | |
|---|---|
| *G01B 3/10* | (2020.01) |
| *G01B 3/00* | (2006.01) |
| *G01B 3/1007* | (2020.01) |
| *G01B 3/1048* | (2020.01) |
| *G01B 3/1056* | (2020.01) |
| *G01B 3/1069* | (2020.01) |
| *G01B 3/1005* | (2020.01) |

(52) U.S. Cl.
CPC ........... *G01B 3/004* (2013.01); *G01B 3/1007* (2020.01); *G01B 3/1048* (2020.01); *G01B 3/1056* (2013.01); *G01B 3/1069* (2020.01); *G01B 2003/1033* (2013.01)

(58) Field of Classification Search
CPC ...... G01B 3/10; G01B 3/1041; G01B 3/1043; G01B 3/1061; G01B 3/1084; G01B 3/1094

USPC .......................... 33/759, 760, 761, 762, 763
See application file for complete search history.

(56) References Cited

U.S. PATENT DOCUMENTS

| | | | | | |
|---|---|---|---|---|---|
| 4,551,847 | A | * | 11/1985 | Caldwell | G01D 5/363 |
| | | | | | 377/24 |
| 4,611,402 | A | * | 9/1986 | Yamamoto | G01B 3/1061 |
| | | | | | 33/762 |
| 4,747,215 | A | * | 5/1988 | Waikas | G01B 7/026 |
| | | | | | 33/763 |
| 5,027,526 | A | * | 7/1991 | Crane | A43D 1/027 |
| | | | | | 33/763 |
| 5,142,793 | A | * | 9/1992 | Crane | G01B 3/1061 |
| | | | | | 33/763 |

(Continued)

OTHER PUBLICATIONS

International Searching Authority, "Notification of Transmittal of The International Search Report and The Written Opinion of the International Searching Authority", for PCT/US2025/032102, mailed Jul. 30, 2025, 12 pages.

*Primary Examiner* — George B Bennett
(74) *Attorney, Agent, or Firm* — ZarleyConley PLC

(57) ABSTRACT

A tape measure assembly and mount system may include a housing assembly having an enclosure with a tape assembly spooled within. An assembly may include the housing assembly having an interface in electronic communication with a controller within the enclosure. An assembly may include the controller having at least one mode selected from a group consisting of a tape/blade distance mode, and an implement distance mode. A mount system may include a first mount and a second mount selectively connected to one another, which may be configured to selectively mount to a power tool and more particularly, may attach to a fence of a power tool.

19 Claims, 9 Drawing Sheets

(56) References Cited

U.S. PATENT DOCUMENTS

| | | | | |
|---|---|---|---|---|
| 5,426,863 | A * | 6/1995 | Biggel | G01B 3/1061 |
| | | | | 33/763 |
| 5,433,014 | A * | 7/1995 | Falk | G01D 5/347 |
| | | | | 455/67.11 |
| 5,983,514 | A * | 11/1999 | Lindsey | G01B 3/1061 |
| | | | | 33/760 |
| 6,928,029 | B2 * | 8/2005 | Rickman | G01S 17/86 |
| | | | | 33/760 |
| 7,363,723 | B1 * | 4/2008 | Peterson | G01B 3/1084 |
| | | | | 33/760 |
| 9,505,071 | B2 | 11/2016 | Knight et al. | |
| 10,349,867 | B2 * | 7/2019 | Bassez | A61B 5/1072 |
| 10,470,556 | B1 | 11/2019 | Choi | |
| 11,092,417 | B1 * | 8/2021 | Luckey | G01B 3/1003 |
| 11,359,903 | B2 * | 6/2022 | Ney | G01B 3/1003 |
| 11,383,336 | B2 * | 7/2022 | Suhling | B27B 27/10 |
| 11,536,552 | B1 * | 12/2022 | Luckey | G01B 3/1069 |
| 11,650,038 | B1 | 5/2023 | Fisher | |
| 2012/0073152 | A1 * | 3/2012 | McGahan | G01B 3/1084 |
| | | | | 33/760 |
| 2018/0120074 | A1 | 5/2018 | Orsini et al. | |
| 2019/0376776 | A1 | 12/2019 | Wang | |
| 2020/0080827 | A1 | 3/2020 | Eun | |
| 2021/0131782 | A1 * | 5/2021 | Bridges | G01B 3/1094 |
| 2025/0327650 | A1 * | 10/2025 | Donnell | G01B 3/1094 |

* cited by examiner

DIGITAL TAPE MEASURE AND MOUNTING SYSTEM

CROSS REFERENCE TO RELATED APPLICATION

This application is a continuation of U.S. patent application Ser. No. 19/226,903 filed Jun. 3, 2025, which claims the benefit and priority of U.S. Provisional Patent Application 63/655,902 filed Jun. 4, 2024. This application also claims the benefit of PCT Application No. PCT/US2025/032102 filed Jun. 3, 2025. The contents of these applications are hereby incorporated by reference in their entirety.

BACKGROUND OF THE INVENTION

This disclosure generally relates to a digital tape measure. More specifically, the disclosure relates to a digital tape measure having unique measuring features and a mounting system for attachment to a power tool, such as a miter saw.

Digital tape measures are known in the art. Digital tape measurements enhance the accuracy of a measurement by displaying the distance measured on a digital display either on the housing of the digital tape measure or remotely on a separate device, such as a smart device, e.g., smart phone.

While advantageous, other problems remain. One problem relates to diminishing accuracy as the digital tape measure is used over time. Poor calibration or software issues leads to the displayed measurement being incorrect, which negates the primary advantage of such devices.

Other problems relate to the complexity of digital tape measures. Digital tape measures are often handheld, which provides a limited area for integration of a user interface. As a result, interfacing with the underlying software of the digital tape measure is complicated by a limited variety of buttons or other controls, which in turn requires the manipulation of multiple buttons or selection within menus to achieve a desire function.

Further, the size and dimension of the digital measure device is often modified to increase the size of the housing and therefore the area for inputs and outputs. This, however, is disadvantageous in that the digital tape measure occupies a larger area on a tool belt or within a toolbox, which also negates the advantage of a tape measure having a compact and readily accessible design.

Still further problems are present for those digital tape measures that rely upon a separate device for use. Such configurations require a separate application to be downloaded to a smart device and the application updated on a regular basis to address variations in the smart device over time. The smart device must also be paired with the digital tape measure directly or via a hub, which increases the possible points of failure. Inherently, the use of separate devices causes other issues with maintaining power with two devices and having to manipulate or refer to two devices to obtain a measurement.

Other digital tape measures have been integrated into power tools. These integrations also have their disadvantages.

For example, when the digital tape measure is part of the overall structure of the power tool and is not readily removable and functional as a standalone digital tape measure. Hence, the digital tape measure has a limited applicability as usage is limited to that power tool. As such, each power tool must have a digital tape measure that is integrated into each respective structure. Additionally, a traditional tape measure or yet another digital tape measure must be present to provide measurements across a variety of power tools as well as away from one or more power tools. Of course, this increases the possible points of failure significantly and can require a litany of corresponding smart devices or applications to interface.

Thus it is a primary aspect of this disclosure to provide a digital tape measure that improves upon the art.

Another aspect of this disclosure is to provide a digital tape measure and mounting system that is functional with and without a power tool.

Yet another aspect of this disclosure is to provide a digital tape measure and mounting system that is functional and interchangeable between a plurality of power tools.

Another aspect of this disclosure is to provide a digital tape measure and mounting system that has a simple interface.

Yet another aspect of this disclosure is to provide a digital tape measure and mounting system that is accurate.

Another aspect of this disclosure is to provide a digital tape measure and mounting system that provides a range of software operability.

Yet another aspect of this disclosure is to provide a digital tape measure and mounting system that is user friendly.

Another aspect of this disclosure is to provide a digital tape measure and mounting system that improves precision and accuracy.

Yet another aspect of this disclosure is to provide a digital tape measure and mounting system that is ergonomic.

These and other aspects, features, and advantages of the invention will become apparent from the specification and claims.

SUMMARY OF THE INVENTION

The disclosure provides various aspects of a digital tape measure and mounting system.

In some aspects, broadly described herein, the techniques described herein relate to a tape measure assembly including: a housing assembly having an enclosure with a tape assembly spooled within; the housing assembly having an interface in electronic communication with a controller within the enclosure; and the controller having at least one mode selected from a group consisting of a tape/blade distance mode, and an implement distance mode.

In some aspects, broadly described herein, the techniques described herein relate to a tape measure assembly further including the at least one mode selected from a group further consisting of a blade distance mode, a midpoint distance mode, a conversion mode, a save mode, and a power mode.

In some aspects, broadly described herein, the techniques described herein relate to a tape measure assembly wherein the implement distance mode senses a distance between a tang of the tape assembly and an implement of a power tool.

In some aspects, broadly described herein, the techniques described herein relate to a tape measure assembly further including the interface having at least one button configured to select among the at least one mode.

In some aspects, broadly described herein, the techniques described herein relate to a tape measure assembly further including the housing assembly having a slanted portion and a display positioned on the slanted portion.

In some aspects, broadly described herein, the techniques described herein relate to a tape measure assembly further including the housing assembly having a front, a rear, a top, a bottom, a first side, and a second side, wherein a slanted portion is positioned on the front of the housing assembly and angles rearwardly and upwardly towards the rear and of the housing assembly.

In some aspects, broadly described herein, the techniques described herein relate to a tape measure assembly further including a lock assembly configured to transition between an unlocked position and a locked position, wherein when the lock assembly is in the locked position, a blade of the tape assembly is clamped such that the blade is restricted from unspooling.

In some aspects, broadly described herein, the techniques described herein relate to a tape measure assembly further including the lock assembly having a lock toggle that extends at an angle extending between a top and a side of the housing assembly when in the locked position.

In some aspects, broadly described herein, the techniques described herein relate to a tape measure assembly further including the tape assembly having a blade that extends between an outward end and an inward end; a tang connected to the outward end of the blade, wherein the tang extends downwardly from the blade and below a bottom of the housing assembly; wherein the bottom of the housing assembly is configured to engage a material during a cut and the tang is configured to an end of the material.

In some aspects, broadly described herein, the techniques described herein relate to a tape measure assembly further including a mount assembly configured to connect to an individual or a power tool.

In some aspects, broadly described herein, the techniques described herein relate to a tape measure assembly further including a mount assembly having a first mount selectively connected to a second mount.

In some aspects, broadly described herein, the techniques described herein relate to a tape measure assembly further including the first mount having a first contour on a rear of the first mount that is matingly received by a second contour of the second mount.

In some aspects, broadly described herein, the techniques described herein relate to a tape measure assembly further including the first contour having a first raised portion, a second raised portion, a first recessed portion, a second recessed portion, and a third recessed portion; and the second contour having a third raised portion, a fourth raised portion, a fifth raised portion, a fourth recessed portion, and a fifth recessed portion.

In some aspects, broadly described herein, the techniques described herein relate to a tape measure assembly further including the second mount having a first arm with a first groove and a second arm with a second groove that selectively receive a first ridge and a second ridge of the first mount.

In some aspects, broadly described herein, the techniques described herein relate to a tape measure assembly further including the first mount having a texture and the second mount having an engagement member, wherein the engagement member is configured to engage and restrict movement of the first mount.

In some aspects, broadly described herein, the techniques described herein relate to a tape measure assembly wherein the engagement member has a housing and a spring-loaded pin, wherein the spring-loaded pin has a compression-spring bias.

In some aspects, broadly described herein, the techniques described herein relate to a tape measure assembly further including the second mount having a channel configured to receive a fence of a power tool.

In some aspects, broadly described herein, the techniques described herein relate to a tape measure assembly further including the second mount having a first securement member received through a rear of the second mount, wherein the first securement member is configured to selectively engage and secure the mount assembly to a power tool.

In some aspects, broadly described herein, the techniques described herein relate to a tape measure assembly including: a housing assembly having a front, a rear, a top, a bottom, a first side, and a second side that form an enclosure; the front of the housing assembly having a slanted portion that is angled rearwardly and upwardly towards the rear and the top of the housing assembly; the housing assembly having a blade opening and a tape assembly having a blade that extends through the blade opening; the blade extending between an outward end positioned outside of the housing assembly and an inward end connected to a spool within the housing assembly; a tang connected to the outward end of the blade, wherein the tang extends downwardly below the bottom of the housing assembly; an interface having a display and at least one button positioned on the housing assembly, wherein the display is positioned on the slanted portion of the housing assembly; the interface electronically connected to a controller within the housing assembly; wherein the controller is configured to control an operation of the spool, the display, and a lock assembly; the controller having at least one mode selected from a group consisting of a tape/blade distance mode, an implement mode, and a midpoint distance mode; the lock assembly configured to transition between an unlocked position and a locked position, wherein when the lock assembly is in the locked position, the blade of the tape assembly is clamped such that the blade is restricted from unspooling; a mount assembly connected to the housing assembly; the mount assembly having a first mount selectively connected to a second mount; the first mount having a first contour included of a first raised portion, a second raised portion, a first recessed portion, a second recessed portion, and a third recessed portion; the second mount having a second contour included of a third raised portion, a fourth raised portion, a fifth raised portion, a fourth recessed portion, and a fifth recessed portion; the first contour of the first mount matingly engaged to the second contour of the second mount; the first mount having a flange offset from the rear of the housing assembly by a connection portion of the first mount; the second mount having a first arm with a first groove and a second arm with a second groove that selectively receive a first ridge and a second ridge of the flange of the first mount; the flange of the first mount having a protrusion at a bottom of the flange; the first mount having a texture of a plurality of lateral ribs on the second recessed portion; the second mount having an engagement member including a spring-biased pin and a housing, wherein the engagement member is configured to engage and restrict movement of the first mount along a length of the flange; the second mount having a channel configured to receive a fence of a power tool; and the second mount having a first securement member is configured to selectively engage and secure the mount assembly to a power tool.

In some aspects, broadly described herein, the techniques described herein relate to a tape measure assembly further including the mount assembly mounted to the fence of the power tool.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
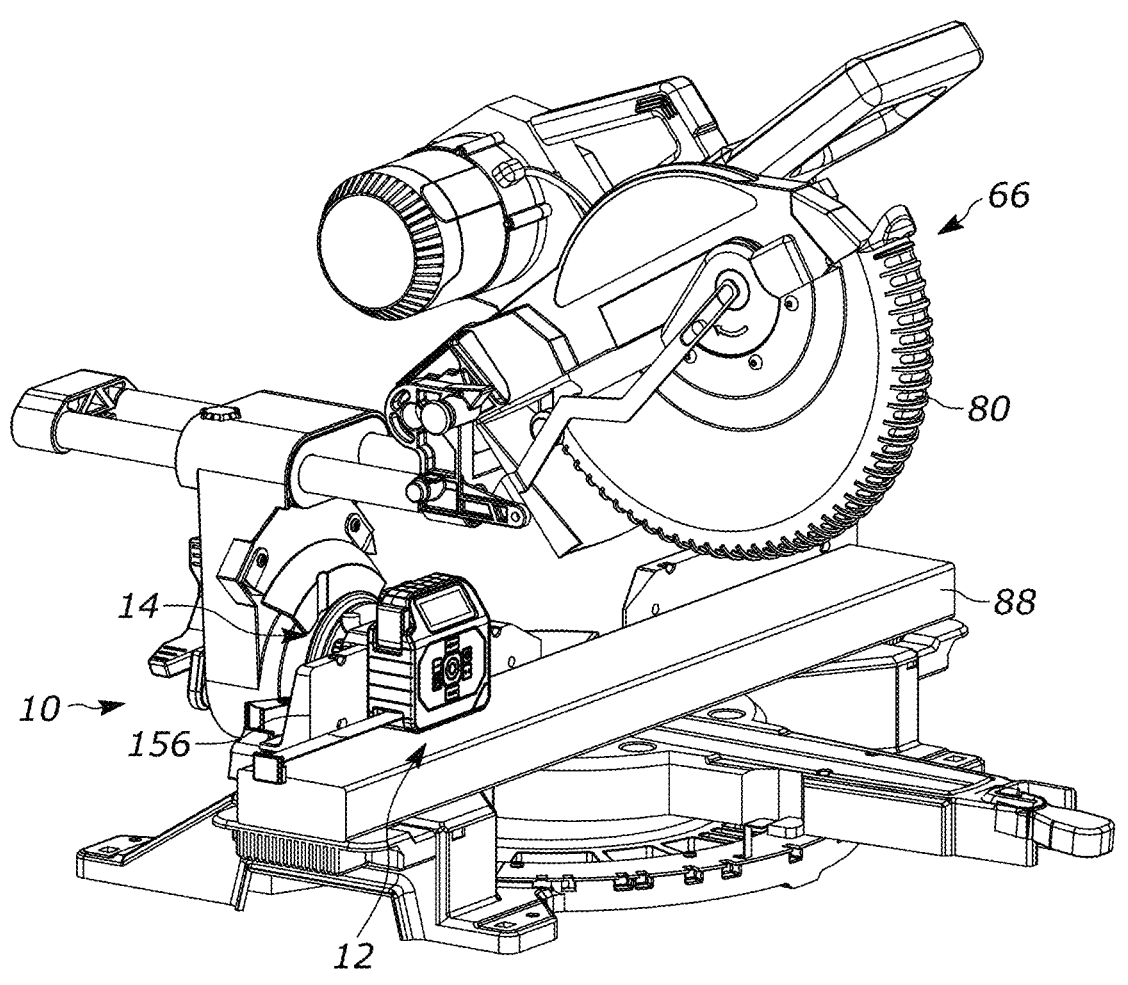
FIG. 1 is a perspective view of a digital tape measure and mounting system mounted to a power tool according to an aspect of the disclosure.

The disclosure described herein is directed to different aspects of a digital tape measure and mounting system. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details.

While reference may be made to various reference numerals, the accompanying drawings may not include such identifiers. Based on the present disclosure, however, those skilled in the art will readily understand where the discussed aspects are present in the drawings.

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

With reference to the FIGS. 1-13, aspects of a digital tape measure and mounting system 10 are shown according to the disclosure. The digital tape measure and mounting system 10 comprises one or more of a tape measure assembly 12 and a mount assembly 14. The tape measure assembly 12 may comprise one or more of a housing assembly 16, a tape assembly 18, an interface 20, a lock assembly 22, and a controller 24. The mount assembly 14 may comprise one or more of a first mount 26 and a second mount 28.

With reference to FIGS. 1-11a and FIG. 12, the housing assembly 16 may comprise one or more of a front 30, a rear 32, a top 34, a bottom 36, a first side 38, and a second side 40 that form an enclosure 42. The front 30 of the housing assembly 16 may have a slanted portion 44 that is angled rearwardly and upwardly towards the rear 32 and the top 34 of the housing assembly 16. The housing assembly 16 may have a blade opening 46, which may be positioned on the first side 38 or the second side 40. The housing assembly 16 may be sized and shaped to permit being held in a hand of an individual.

Figure 2:
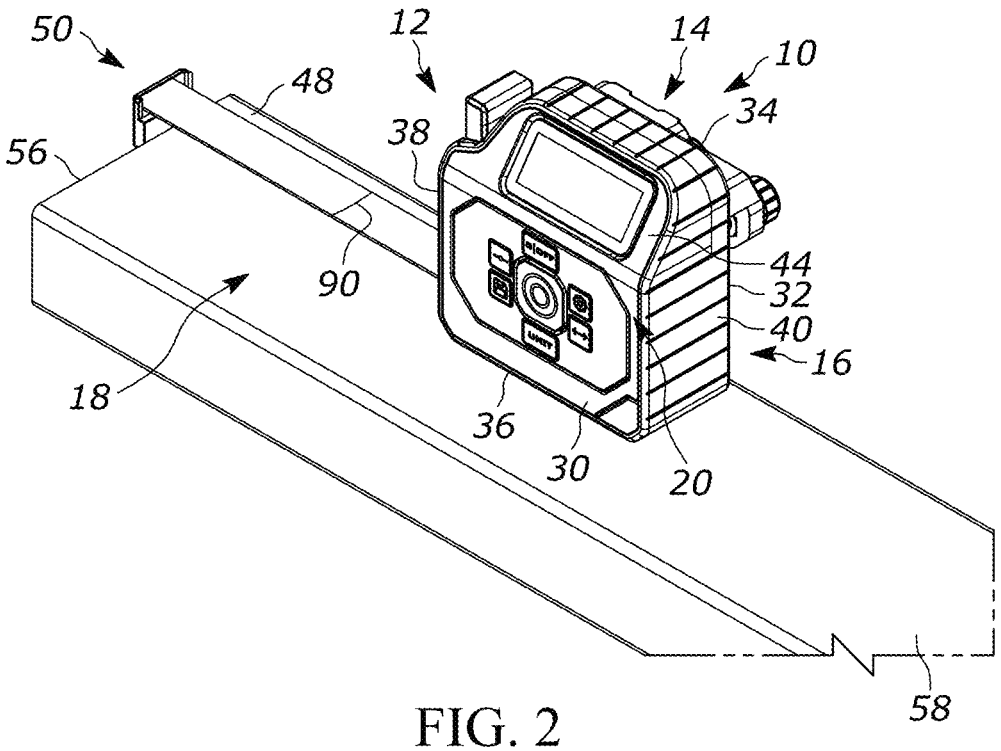
FIG. 2 is a perspective view of a digital tape measure and mounting system operating on a material according to an aspect of the disclosure.

With particular reference to FIG. 2, the tape assembly 18 comprises one or more of a blade 48 that extends from an outward end 50 to an inward end 52. The blade 48 may be positioned such that the outward end 50 is positioned outside of the housing assembly 16 while the inward end 52 is positioned within the enclosure 42 of the housing assembly 16. In this way, the blade 48 may extend through the blade opening 46 of the housing assembly 16.

A tang 54 may be connected to the blade 48 at the outward end 50. The tang 54 may extend downwardly from the connection to the blade 48 such that the tang 54 extends below the bottom 36 of the housing assembly 16. The tang 54 may be sized and shaped to prevent the outward end 50 of the blade 48 from passing through the blade opening 46 and inside the enclosure 42 of the housing assembly 16. The tang 54 may be configured to engage an end 56 of a material 58 such as when the material 58 is being measured.

The inward end 52 of the blade 48 may be connected to a spool 60 positioned within the enclosure 42 of the housing assembly 16. The blade 48 may be spooled about the spool 60 under tension such that the blade 48 is biased towards spooling and requires resistance against this tension for extension away from the housing assembly 16. The ability to unspool the blade 48 may be inhibited or prohibited by the lock assembly 22 as described herein.

Figure 3:
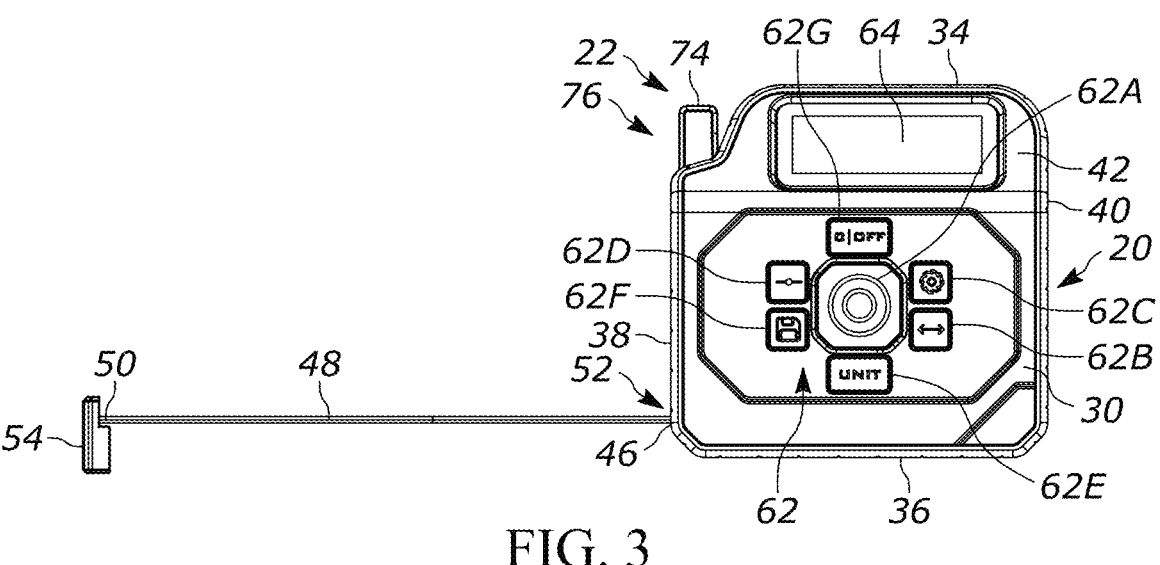
FIG. 3 is a front view of a digital tape measure and mounting system according to an aspect of the disclosure.
Figure 4:
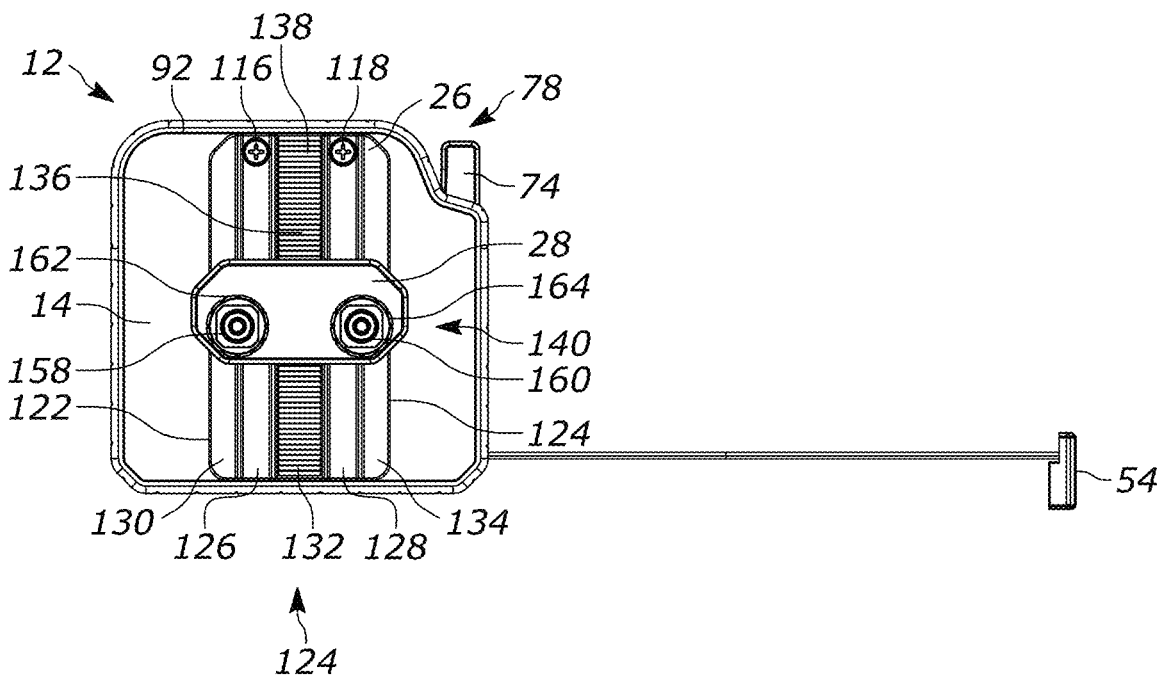
FIG. 4 is a rear view of a digital tape measure and mounting system according to an aspect of the disclosure.
Figure 10:
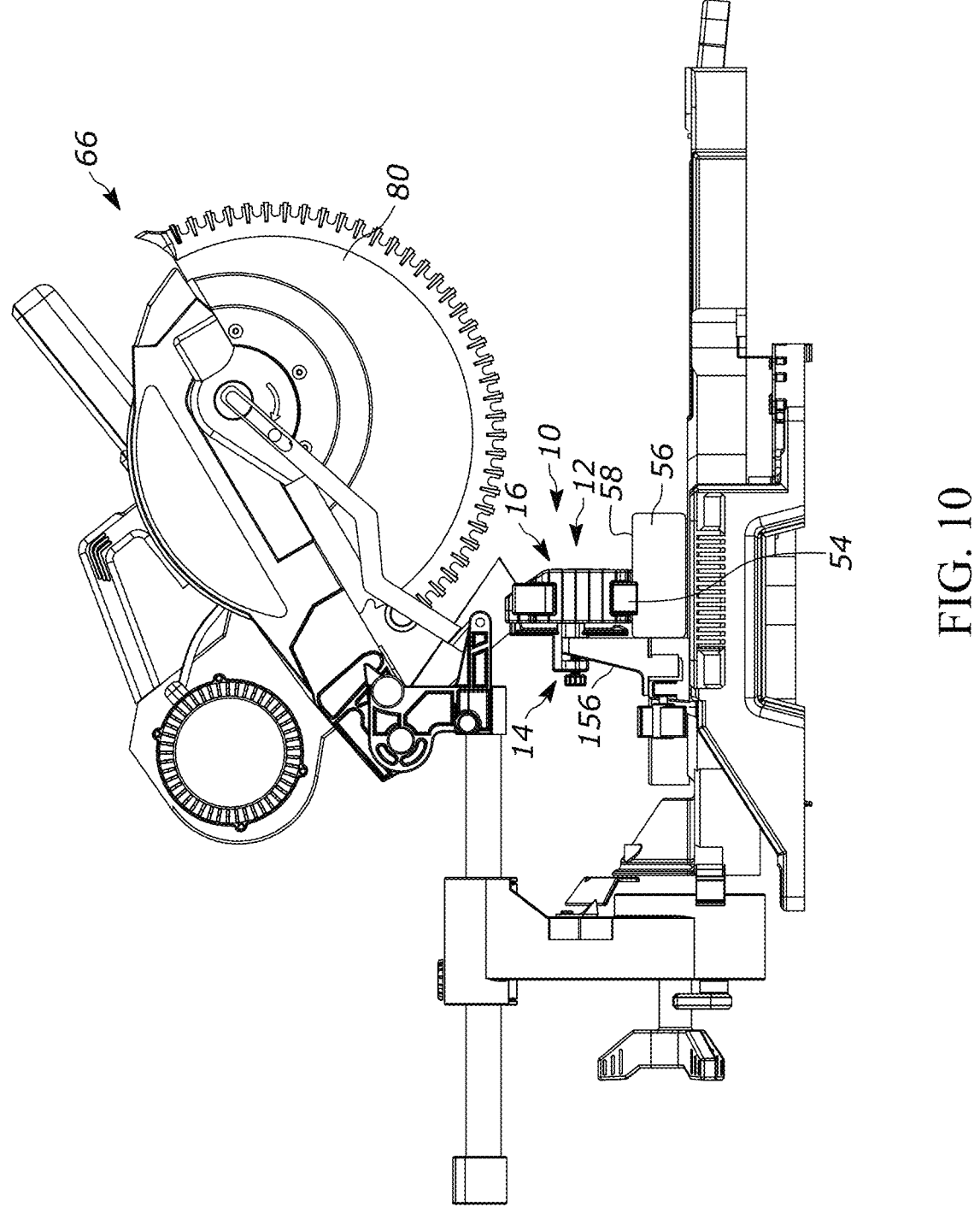
FIG. 10 is a side view of a digital tape measure and mounting system mounted to a power tool according to an aspect of the disclosure.

With particular reference to FIG. 3, the interface 20 may comprise at least one button 62 and a display 64. The interface 20 may be positioned about the housing assembly 16. With particular reference to FIGS. 2 and 3, the interface 20 may be positioned on or through the front 30 of the housing assembly 16. In some aspects, the display 64 of the interface 20 may be positioned on the slanted portion 44, which provides the unique advantage of being easily and ergonomically viewable when the digital tape measure and mounting system 10 is mounted to a power tool 66 (such as a miter saw as shown in FIG. 1 and FIG. 10).

The at least one button 62 may include one or more of a blade distance button 62A, a tape/blade distance button 62B, an implement distance button 62C, a midpoint distance button 62D, a unit conversion button 62E, a save button 62F, and a power button 62G. The at least one button 62 may be in communication with the controller 24 to select at least one mode 68 stored in a memory 70 associated with the controller 24 as described herein.

The display 64 may be configured to show the at least one indicia 72. The at least one indicia 72 may include one or more of a distance/unit indicator 72A, a power indicator 72B, and a mode indicator 72C as described herein. The at least one indicia 72 may be selected and/or toggled using the at least one button 62. The display 64 in some aspects may be illuminated to facilitate viewing in dark areas.

Figure 12:
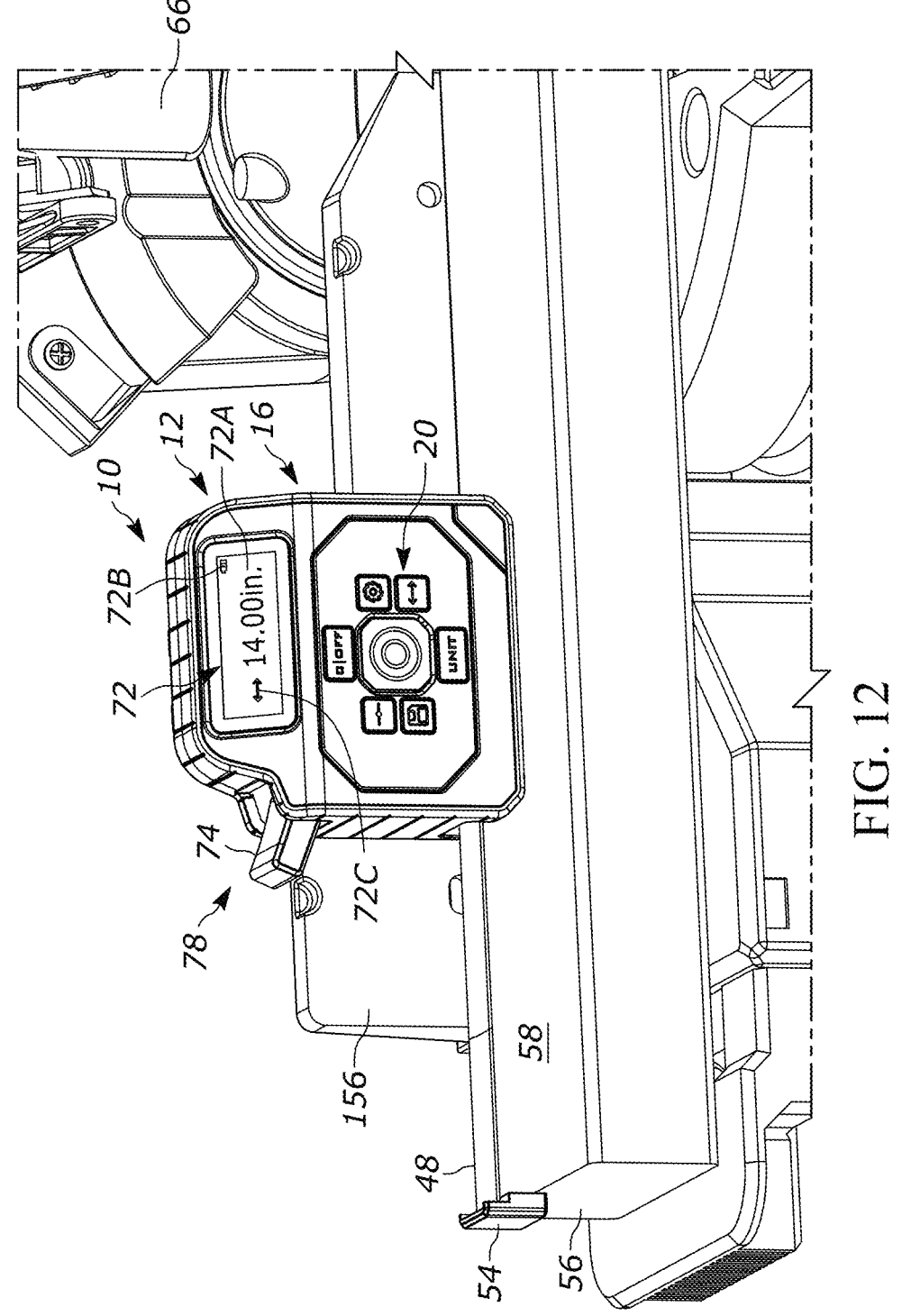
FIG. 12 is a front view of a digital tape measure and mounting system in a locked position according to an aspect of the disclosure.

With particular reference to FIGS. 2 and 12, the lock assembly 22 may comprise a lock toggle 74. The lock assembly 22 is configured to clamp against the blade 48 of the tape assembly 18 to restrict or prohibit the blade 48 from spooling or unspooling as described herein. The lock toggle 74 may be positioned in one or more location about the housing assembly 16. The lock toggle 74 may be positioned on or through the first side 38 or the second side 40 of the housing assembly 16. The lock toggle 74 may also be positioned adjacent or abutting the top 34 of the housing assembly 16, which positions the lock toggle 74 in a readily viewable and ergonomic position on the housing assembly 16. The lock toggle 74 is configured to transition between an unlocked position 76 wherein the unspooling of the blade 48 is not inhibited or prohibited beyond the natural tension of the spool 60 and a locked position 78 wherein the unspooling of the blade 48 is inhibited beyond the natural tension of the spool 60 or prohibited entirely. The lock toggle 74 may extend from the housing assembly 16 parallel to or substantially parallel to the length of the first side 38 of the housing assembly 16 when in the unlocked position 76. The lock toggle may extend at angle extending between the top 34 and the first side 38 of the housing assembly 16 when in the locked position 78, which provides the advantage of providing a visual indicator that is enhanced due to the lock toggle 74 visually diverging from the lines formed by the top 34 and the first side 38 of the housing assembly 16.

Figure 13:
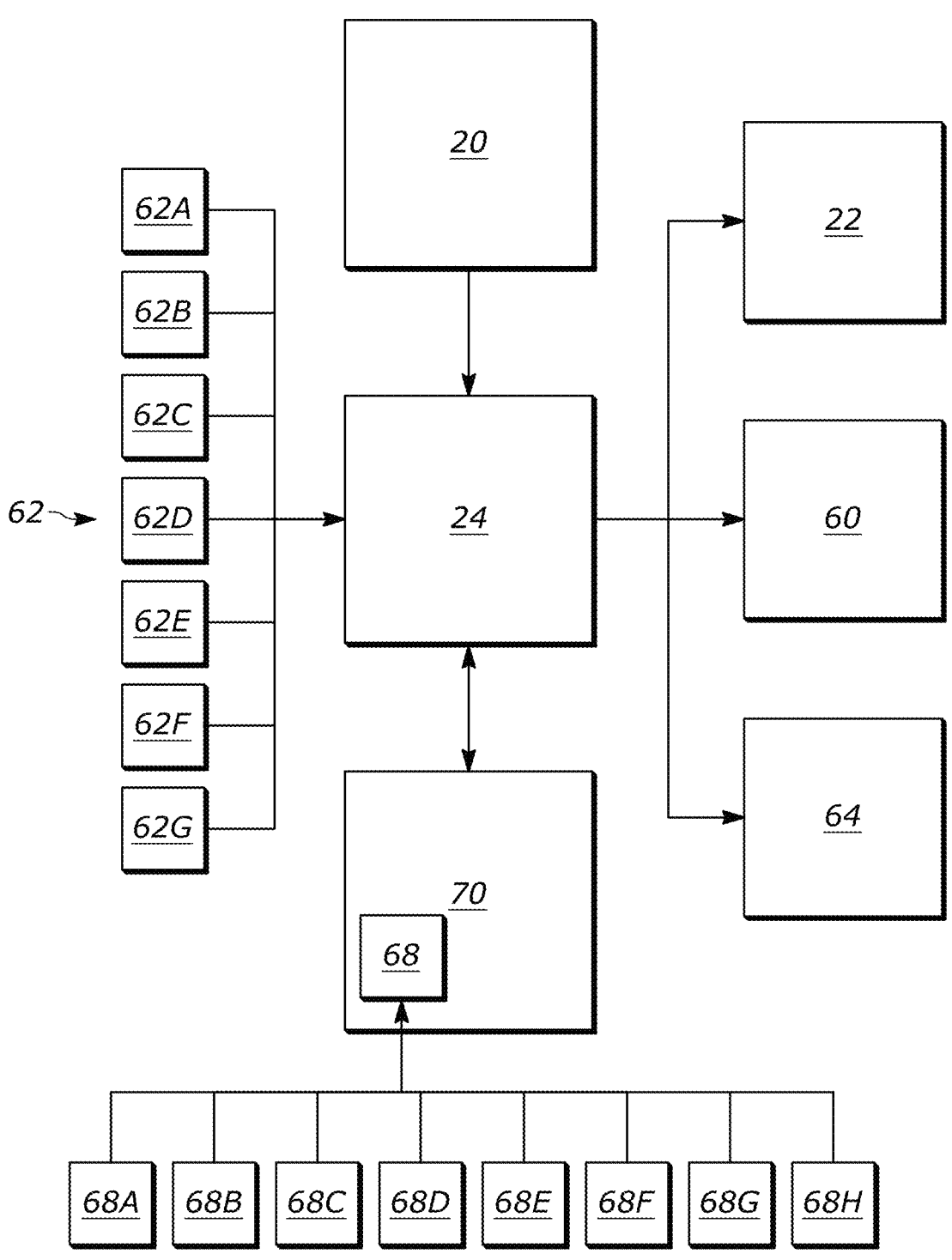
FIG. 13 is a schematic view of digital tape measure and mounting system according to an aspect of the disclosure.

With particular reference to FIG. 13, the controller 24 may be configured to control the operation of one or more of the lock assembly 22, the display 64, and the spool 60. Such operation may be based on the at least one mode 68. Such operation may be manually set by an individual through manipulation of the at least one button 62 to select the at least one mode 68 as described herein. The at least one mode 68 may also or exclusively be selected automatically, such as by the controller 24 and/or the power tool 66. The at least one mode 68 may include one or more of a blade distance mode 68A, a tape/blade distance mode 68B, an implement distance mode 68C, a midpoint distance mode 68D, a locked mode 68E, a conversion mode 68F, a save mode 68G, and a power mode 68H. The at least one mode 68 may be displayed as the mode indicator 72C on the display.

In the blade distance mode 68A, the controller 24 may be configured to sense a distance the blade 48 extends from the housing assembly 16, i.e., a distance of the blade 48 between the tang 54 and the blade opening 46. The controller 24 may display the sensed distance on the display 64, i.e., the distance/unit indicator 72A. Selection of the blade distance mode 68A may be made using the blade distance button 62A.

In the tape/blade distance mode 68B, the controller 24 may be configured to sense a distance between the tang 54 and an opposing side of the housing assembly 16 from which the blade 48 extends from the housing assembly 16. For example, when the blade 48 extends from the first side 38 of the housing assembly 16, the sensed distance includes the distance the blade 48 extends from the housing assembly 16 as well as the distance between the first side 38 and the second side 40 of the housing assembly 16. The controller 24 may display the sensed distance on the display 64, i.e., the distance/unit indicator 72A. Selection of the tape/blade distance mode 68B may be made using the tape/blade distance button 62B.

In the implement distance mode 68C, the controller 24 may be configured to sense a distance between the tang 54 and an implement 80, which may be part of the power tool 66 (e.g., a saw blade of a miter saw). The sensed distance may be based on the tape measure assembly 12 being mounted to at a predefined distance or user-defined distance from the implement 80, such as by way of the mount assembly 14 described herein. The controller 24 may display the sensed distance on the display 64, i.e., the distance/unit indicator 72A. Selection of the implement distance mode 68C may be made using the implement distance button 62C.

In the midpoint distance mode 68D, the controller 24 may be configured to sense and/or calculate a distance less than the sensed distance, which may be based on the blade distance mode 68A, the tape/blade distance mode 68B, and the implement distance mode 68C. For example, the sensed and/or calculated distance may be a midpoint or other fraction (e.g., ⅓, ¼, ⅛, etc.) of the distance sensed by the controller 24 in the blade distance mode 68A. The controller may display the sensed and/or calculated distance on the display 64, i.e., the distance/unit indicator 72A. Selection of the midpoint distance mode 68D may be made using the midpoint distance button 62D.

In the locked mode 68E, the controller 24 may be configured to activate the lock assembly 22 to transition to the locked position 78 and/or unlocked position 76. In the locked mode 68E, the controller 24 may selectively activate the lock assembly 22 when a predetermined and/or distance saved in the memory 70 is reached by the tang 54 based on the at least one mode 68. In this way, the locked mode 68E and/or the lock assembly 22 allow the material 88 to be interacted with in a precise, accurate, and repeatable fashion, such as repeated cuts by the power tool 66. The controller 24 may display the mode indicator 72C on the display 64 to indicate if the lock assembly 22 is in the locked position 78 or unlocked position 76. Selection of the locked mode 68E may be made the lock toggle 74 and/or the at least one button 62.

In the conversion mode 68F, the controller 24 may be configured to change the distance/unit indicator 72A to a desired unit, such as metric to imperial and/or from a fraction to a decimal. Selection of the conversion mode 68F may be made using the unit conversion button 62E.

In the save mode 68G, the controller 24 may be configured to record and/or save one or series of measurements taken in one or more of the at least one mode 68. The controller 24 may be configured to alter the operation of the at least one mode 68 based on the recorded or saved measurements. Selection of the save mode 68G may be made using the save button 62F.

In the power mode 68H, the controller 24 may toggle between an active and inactive state. In the latter, the operation of the tape measure assembly 12 is not controlled by the controller 24 in any respect. As described herein, when the controller 24 is in the inactive state, the tape measure assembly 12 is operated manually as a conventional tape measure, wherein physical indicia 90 on the blade 48 indicate the distance between the tang 54 and the housing assembly 16. When inactive, the lock assembly 22 may still function by way of manual manipulation of the lock toggle 74.

Figure 5:
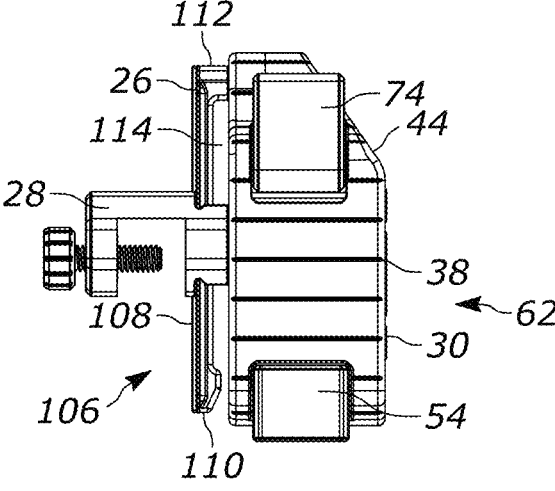
FIG. 5 is a side view of a digital tape measure and mounting system according to an aspect of the disclosure.
Figure 6:
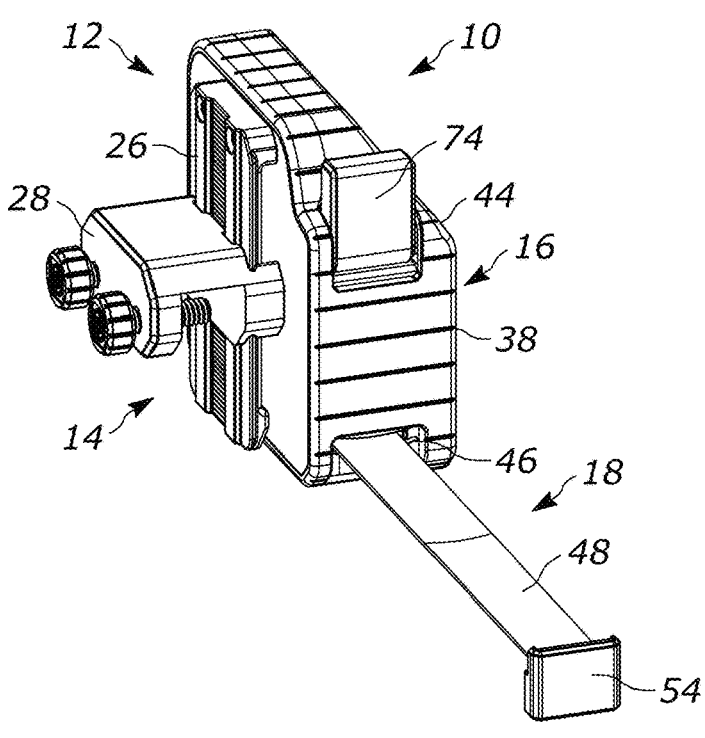
FIG. 6 is a perspective view of a digital tape measure and mounting system according to an aspect of the disclosure.
Figure 8:
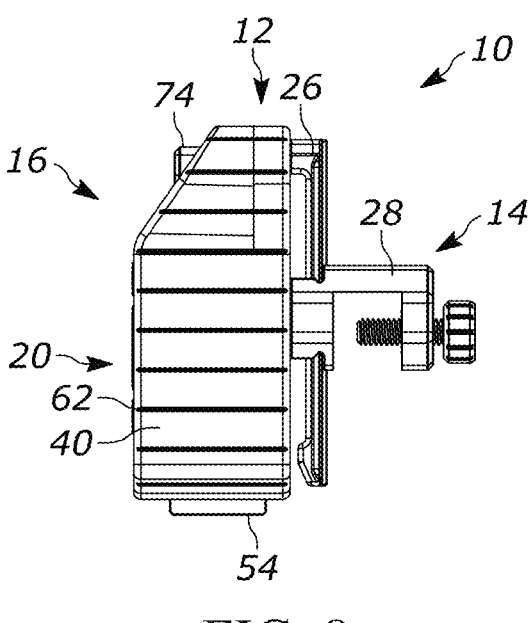
FIG. 8 is a side view of a digital tape measure and mounting system according to an aspect of the disclosure.
Figure 11A:
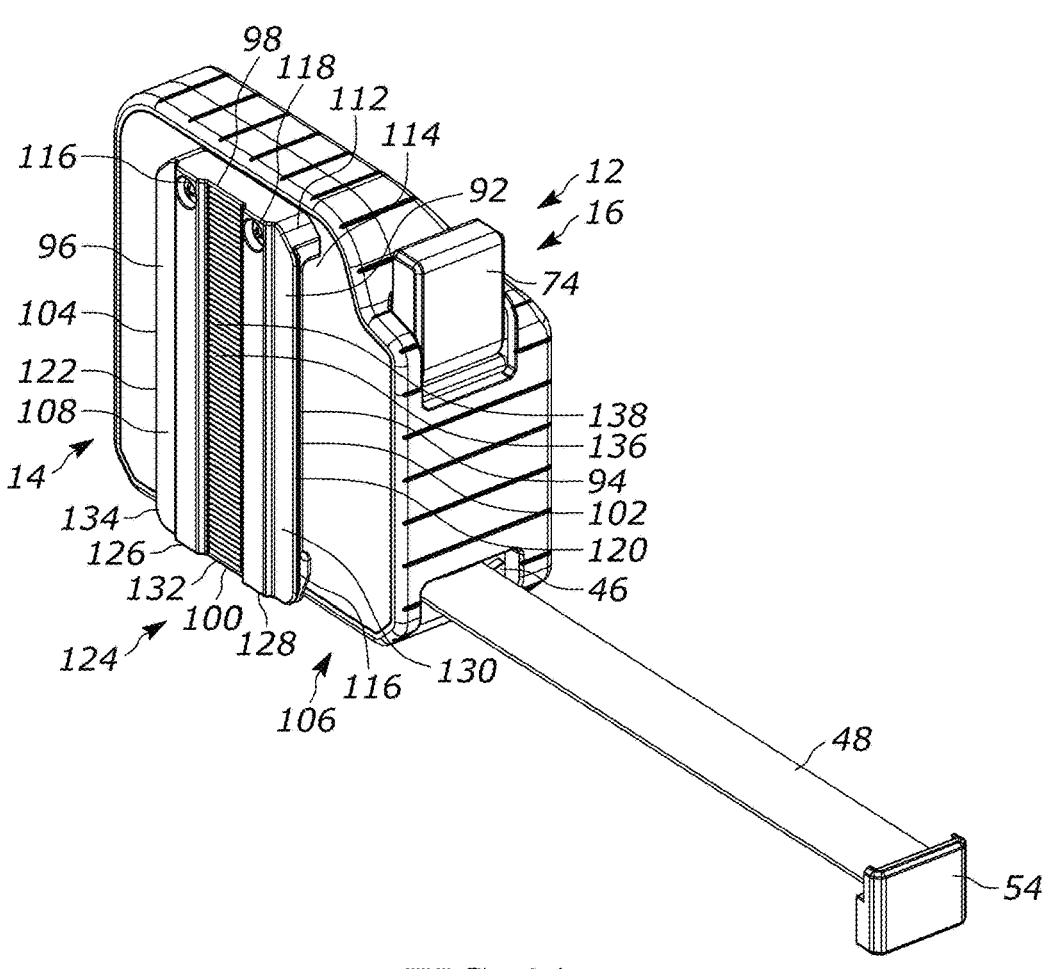
FIG. 11a is a rear perspective view of a digital tape measure and mounting system according to an aspect of the disclosure.

With particular reference to FIGS. 5, 8, and 11a, the first mount 26 of the mount assembly 14 may have a first body 92 that has a front 94, a rear 96, a top 98, a bottom 100, a first side 102, and a second side 104. The first body 92 may be shaped as a clip 106 that may comprise a flange 108, a connection portion 112, and a protrusion 110. The clip 106 may be configured to attach to an individual, such as over a tool belt.

In some such aspects of the disclosure, the flange 108 may extend in an elongated fashion from the top 98 to the bottom 100 such that the size of the flange 108 is larger from the top 98 to the bottom 100 as compared with the distance between the first side 102 to the second side 104. When connected to the tape measure assembly 12, such as by way of the connection portion 112, the flange 108 may extend in parallel or substantially parallel-spaced alignment with the rear 32 of the tape measure assembly 12 such that a gap or a space 114 is formed between the rear 32 of the tape measure assembly 12 and the front 94 of the clip 106.

The connection portion 112 of the clip 106 may comprise at least one opening 116 that may receive at least one first connector 118. The at least one opening 116 may extend through both the flange 108 and connection portion 112, such that the at least one first connector 118 may be accessed to attach or remove the clip 106 from the tape measure assembly 12. The connection portion 112 may be positioned adjacent to or from the top 98 of the clip 106. The connection portion 112 may be a separate structure or monolithically formed with the flange 108. The connection portion 112 may extend forwardly from the front 94 of the flange 108 to the rear 32 of tape measure assembly 12, such that the size of the connection portion 112 defines a dimension of the space 114 between the flange 108 and the tape measure assembly 12.

The protrusion 110 of the clip 106 may have a trapezoidal-shape and extend transversely across the front 94 of the clip 106 between the first side 102 to the second side. The protrusion 110 may be positioned adjacent to or from the bottom 100 of the clip 106. The protrusion 110 may be a separate structure or monolithically formed with the flange 108. The protrusion 110 may be sized and shaped such that the protrusion 110 does not engage the rear of the tape measure assembly 12 when the first body 92 is connected to the tape measure assembly by the connection portion 112.

The first side 102 and/or the second side 104 of the first body 92 and/or the flange 108 may be tapered distally such that the first side 102 may have a first ridge 120 and the second side 104 may have a second ridge 122.

The rear 96 of the first body 92 may have a first contour 124 that may comprise one or more of a first raised portion 126 and a second raised portion 128. The first raised portion 126 and/or the second raised portion 128 may be offset from the first side 102 and the second side 104 of the first body, such that a first recessed portion 130 extends from the first side 102 to the first raised portion 126 and a second recessed portion 132 extends from the second side 104 to the second raised portion 128. Positioned between the first raised portion 126 and the second raised portion 128 may be a third recessed portion 134. The first contour 124 may have a texture 136. The texture 136 may be a series of lateral ribs 138 and may only extend along a length of the third recessed portion 134.

Figure 7:
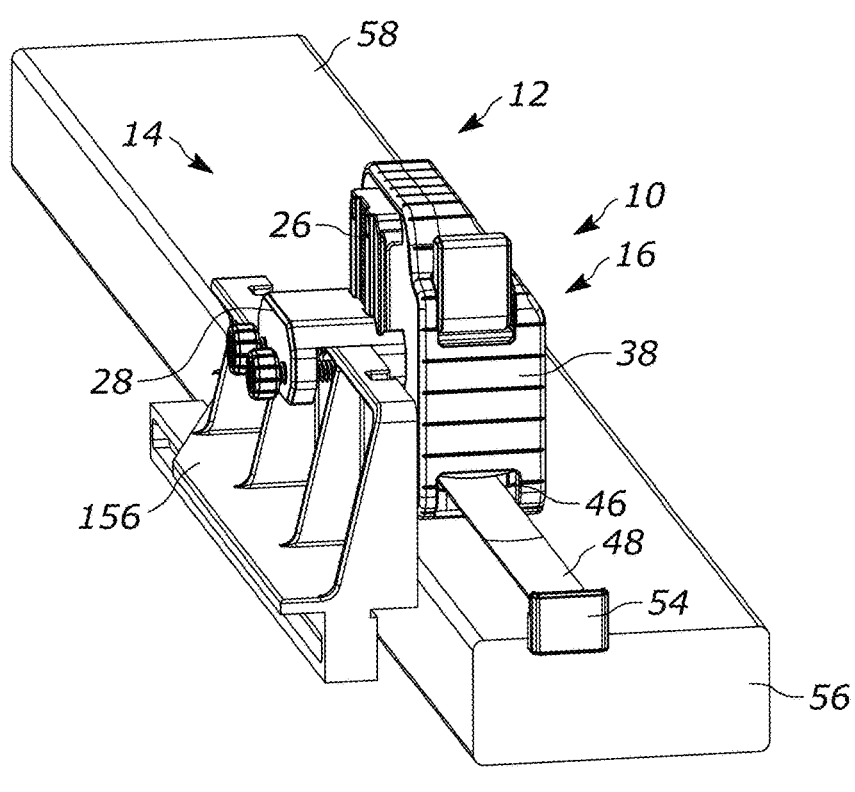
FIG. 7 is a perspective view of a digital tape measure and mounting system mounted to a fence of a power tool according to an aspect of the disclosure.
Figure 9:
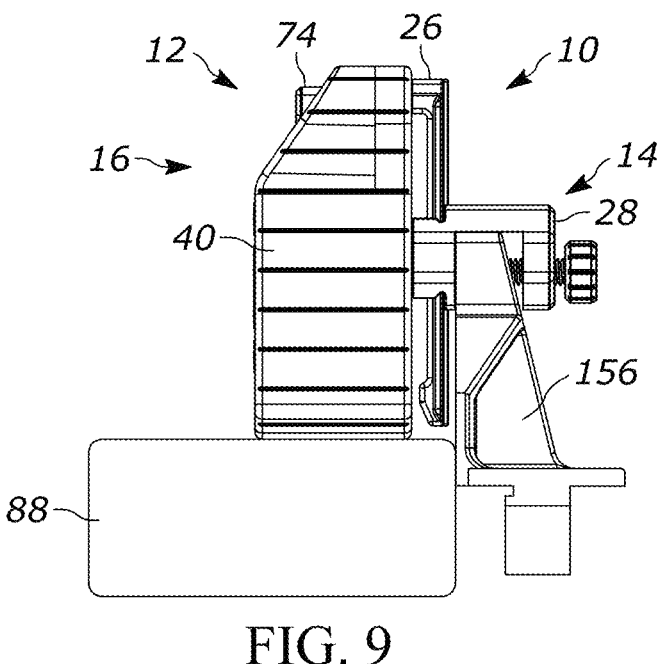
FIG. 9 is a side view of a digital tape measure and mounting system mounted to a fence of a power tool according to an aspect of the disclosure.
Figure 11B:
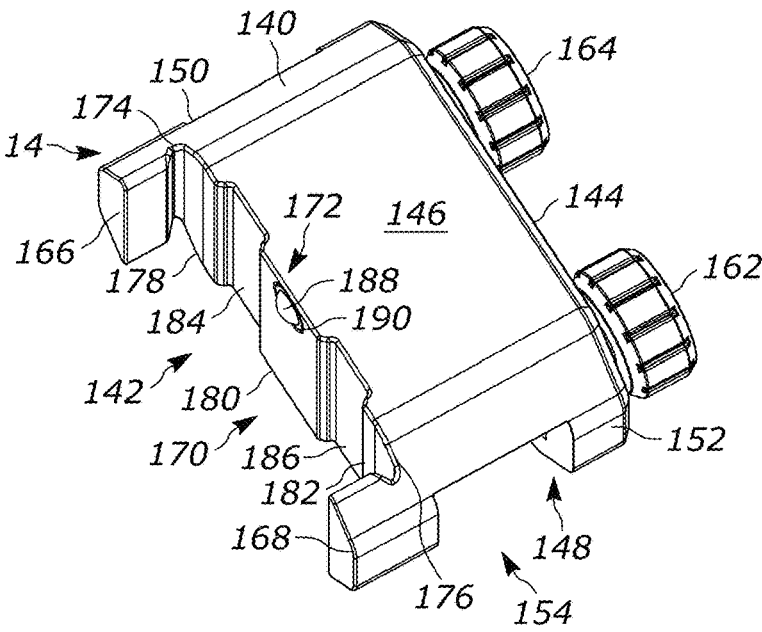
FIG. 11b is a perspective view of a digital tape measure and mounting system according to an aspect of the disclosure.

With particular reference to FIGS. 5, 8, and 11b, the second mount 28 of the mount assembly 14 may have a second body 140 that has a front 142, a rear 144, a top 146, a bottom 148, a first side 150, and a second side 152. The second body 140 may have a channel 154 extend upwardly from the bottom 148 of the second body 140 and through the first side 150 and second side 152, such that the second body 140 has a shape of an upside down "U." Such a configuration allows the second body 140 to be placed over a fence 156 of the power tool 66 such as depicted in the example of FIG. 7 and FIG. 9. The rear 144 of the second body 140 may have a first securement opening 158 and/or a second securement opening 160 that may respectively receive a first securement member 162 and a second securement member 164. The first securement opening 158 and the second securement opening 160 may extend from and through rear 144 of the second body 140 to the channel 154. The first securement member 162 and/or the second securement member 164 may be thumbscrews. In this way, the second mount 28 may be placed over the fence 156 of the power tool 66 (or other similar structure) such the fence 156 is positioned within the channel 154 and the first securement member 162 and the second securement member may be manipulated to secure the second mount 28 to the fence 156.

The front 142 of the second body 140 may have a first arm 166, a second arm 168, a second contour 170, and an engagement member 172. The first arm 166 may extend forwardly from the front 142 of the second body 140 adjacent to or abutting the first side 150 of the second body 140. The second arm 168 may extend forwardly from the front 142 of the second body 140 adjacent to or abutting the second side 152 of the second body 140. The first arm 166 may have a first groove 174 that is sized and shaped to matingly receive the first ridge 120 and/or the first side 102 of the first mount 26. The second arm 168 may have a second groove 176 that is sized and shaped to matingly receive the second ridge 122 and/or the second side 104 of the first mount 26. Between the first arm 166 and the second arm 168 may be a space The second contour 170 of the front 142 of the second mount 28 may be configured to matingly receive, interlockingly receive, and/or slidably receive the first contour 124 of the first mount 26. The second contour 170 may comprise one or more of a third raised portion 178, a fourth raised portion 180, and/or a fifth raised portion 182, each of which may be offset from one another such that a fourth recessed portion 184 is positioned between the third raised portion 178 and the fourth raised portion 180 and a fifth recessed portion 186 is positioned between the fourth raised portion 180 and the fifth raised portion 182. The third raised portion 178 may extend from the first arm 166 to the fourth recessed portion 184 and/or the fifth raised portion 182 may extend from the second arm 168 to the fifth recessed portion 186.

The engagement member 172 may be a spring plunger, such that the engagement member 172 comprises a spring-loaded pin 188 positioned partially within a housing 190, wherein the spring-loaded pin 188 has a compression spring-bias that applies force on the spring-loaded pin 188 to extend forwardly parallel to or forwardly from the second contour 170. This configuration allows the engagement member 172 to engage with the texture 136 of the first contour 124 when the first mount 26 and the second mount 28 are matingly connected to one another. The engagement member 172 may be positioned on the fourth raised portion 180 to engage the texture 136 on the third recessed portion 134 of the first mount 26.

The engagement member 172 may be positioned adjacent to or abutting the top 146 of the second mount 28. In this way, when the first mount 26 is received by the second mount 28, the engagement member 172 may engage the texture adjacent or abutting the bottom 100 of the first mount 26. However, as the texture 136 may extend between the top 98 to the bottom 100 of the first mount 26, the first mount 26 and the second mount 28 can be interconnected anywhere along the length spanning between the top 98 and the bottom 100 of the first mount 26. In this way, the vertical positioning of the tape measure assembly 12 is maximized thereby permitting use of the digital tape measure and mounting system 10 with the material 88 a large variation in dimensions.

Therefore, a digital tape measure and mounting system 10 has been provided that is functional with and without a power tool, is functional and interchangeable between a plurality of power tools, has a simple interface, is accurate, provides a range of software operability, is user friendly, improves precision and accuracy, is ergonomic, and improves upon the art.

From the above discussion and accompanying figures and claims it will be appreciated that the digital tape measure and mounting system 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A tape measure assembly comprising:
a housing assembly having a front, a rear, a top, a bottom, a first side having a blade opening, and a second side, wherein a slanted portion having a display is positioned on the front of the housing assembly and angles rearwardly and upwardly towards the top and the rear and of the housing assembly;
the housing assembly having an enclosure with a tape assembly spooled within; and
the housing assembly having an interface in electronic communication with a controller within the enclosure.

2. The tape measure assembly of claim 1 further comprising the controller having a mode is selected from a group further consisting of a tape/blade distance mode, and an implement distance mode, a blade distance mode, a midpoint distance mode, a conversion mode, a save mode, and a power mode.

3. The tape measure assembly of claim 2 further comprising the interface having at least one button configured to select among the mode.

4. The tape measure assembly of claim 1 further comprising a lock assembly configured to transition between an unlocked position and a locked position, wherein when the lock assembly is in the locked position, a blade of the tape assembly is clamped such that the blade is restricted from unspooling.

5. The tape measure assembly of claim 4 further comprising the lock assembly having a lock toggle that extends at an angle extending between the top and the first a side of the housing assembly when in the locked position.

6. The tape measure assembly of claim 1 further comprising the tape assembly having a blade that extends between an outward end and an inward end; a tang connected to the outward end of the blade, wherein the tang extends downwardly from the blade and below the bottom of the housing assembly; wherein the bottom of the housing assembly is configured to engage a material during a cut and the tang is configured to an end of the material.

7. The tape measure assembly of claim 1 further comprising a mount assembly configured to connect to an individual and a power tool.

8. The tape measure assembly of claim 1 further comprising a mount assembly having a first mount connected to and extending outwardly from the rear of the housing assembly; the first mount slidably connected to a second mount such that a position of the first mount and the second mount can be adjusted vertically; and the first mount positioned between the housing assembly and the second mount.

9. The tape measure assembly of claim 8 further comprising the first mount having a first contour on a rear of the first mount that is matingly received by a second contour of the second mount.

10. The tape measure assembly of claim 9 further comprising the first contour having a first raised portion, a second raised portion, a first recessed portion, a second recessed portion, and a third recessed portion; and the second contour having a third raised portion, a fourth raised portion, a fifth raised portion, a fourth recessed portion, and a fifth recessed portion.

11. The tape measure assembly of claim 8 further comprising the second mount having a first arm with a first groove and a second arm with a second groove that selectively receive a first ridge and a second ridge of the first mount.

12. The tape measure assembly of claim 8 further comprising the first mount having a texture and the second mount having an engagement member, wherein the engagement member is configured to engage and restrict movement of the first mount.

13. The tape measure assembly of claim 8 further comprising the second mount having an engagement member configured to engage and restrict movement of the first mount, and the engagement member has a housing and a spring-loaded pin, wherein the spring-loaded pin has a compression-spring bias.

14. The tape measure assembly of claim 8 further comprising the second mount having a channel configured to receive a fence of a power tool.

15. The tape measure assembly of claim 13 further comprising the second mount having a first securement member received through a rear of the second mount, wherein the first securement member is configured to selectively engage and secure the mount assembly to a power tool.

16. A tape measure assembly comprising:
a housing assembly having an enclosure with a tape assembly spooled within; and
a mount assembly connected to a rear of the housing assembly and having a first mount connected to and extending outwardly from the rear of the housing assembly;

the first mount slidably connected to a second mount such that a position of the first mount and the second mount can be adjusted vertically; and
the first mount positioned between the housing assembly and the second mount.

17. A tape measure assembly comprising:
a housing assembly having an enclosure with a tape assembly having a blade spooled within; and
the housing assembly having an interface in electronic communication with a controller within the enclosure; and
the controller having a tape/blade distance mode wherein the controller is configured to sense a distance between a tang attached to the blade and a side of the housing assembly opposite of a blade opening, and an implement distance mode wherein the controller is configured to sense a distance between the tang and an implement of a power tool, a blade distance mode wherein the controller is configured to sense a distance of a blade of the tape assembly, a midpoint distance mode, a conversion mode, a save mode, a locked mode, and a power mode.

18. The tape measure assembly of claim 17 wherein a sensed distance of the implement distance mode is based on a predefined location at which the tape measure assembly is mounted to the power tool.

19. A tape measure assembly comprising:
a housing assembly having an enclosure with a tape assembly having a blade spooled within; and;
the blade extends between an outward end and an inward end;
a tang connected to the outward end of the blade, wherein the tang extends downwardly from the blade and below a bottom of the housing assembly;
wherein the bottom of the housing assembly is configured to engage a material during a cut and the tang is configured to an end of the material.

* * * * *